(12) United States Patent
Okazaki et al.

(10) Patent No.: US 7,757,244 B2
(45) Date of Patent: Jul. 13, 2010

(54) OPTICAL DISK DRIVE

(75) Inventors: Nobuyuki Okazaki, Daito (JP); Ryuuji Hayashi, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 1037 days.

(21) Appl. No.: 11/482,771

(22) Filed: Jul. 10, 2006

(65) Prior Publication Data

US 2007/0008857 A1 Jan. 11, 2007

(30) Foreign Application Priority Data

Jul. 11, 2005 (JP) ............................. 2005-201841

(51) Int. Cl.
*G11B 7/00* (2006.01)
(52) U.S. Cl. ................................... 720/689
(58) Field of Classification Search ................ 720/689, 720/690, 691, 692, 693, 694
See application file for complete search history.

(56) References Cited

U.S. PATENT DOCUMENTS 7,543,314 B2 * 6/2009 Park et al. .................. 720/692

| | | | |
|---|---|---|---|
| 2002/0110072 A1 * | 8/2002 | Yanagiguchi | 369/75.2 |
| 2003/0142611 A1 | 7/2003 | Kume | |
| 2004/0154029 A1 | 8/2004 | Nishidate | |

FOREIGN PATENT DOCUMENTS

| EP | 1 688 941 A1 | 8/2006 |
|---|---|---|
| JP | 2002-093013 | 3/2002 |
| JP | A-2004-079024 | 3/2004 |
| JP | A-2004-152388 | 5/2004 |
| JP | 2005-174427 | 6/2005 |

* cited by examiner

*Primary Examiner*—David D Davis
(74) *Attorney, Agent, or Firm*—Morgan Lewis & Bockius LLP

(57) ABSTRACT

When a shift lever is fitted under a front part of a traverse mechanism, dampers have previously been fitted in a total of two, front-left and front-right, parts, called mount parts, of a mechanism chassis. A flat gear rotatably engages with a cylindrical sleeve protruding downward from the front-right mount part of the mechanism chassis. A feed gear in a rear part of transmission means rotatably engages with a boss protruding downward behind the sleeve, and is prevented from dropping off with a screw put from below. Now, the flat gear is, in a rear part thereof, supported by the feed gear, and is thereby prevented from dropping off.

2 Claims, 5 Drawing Sheets

OPTICAL DISK DRIVE

This application is based on Japanese Patent Application No. 2005-201841 filed on Jul. 11, 2006, the contents of which are hereby incorporated by reference.

BACKGROUND OF THE INVENTION

1. Field of the Invention

The present invention relates to a disc apparatus that records to and plays back from a disc-shaped recording medium such as a CD or DVD; more particularly, the present invention relates to an assembly structure of a traverse mechanism and gears.

2. Description of Related Art

One known type of disc apparatus is structured as follows: a disc tray having a disc-shaped recording medium placed thereon is moved into a cabinet, then the disc-shaped recording medium is clamped between a disc holder (clamper) and a turntable, both provided inside the cabinet, and then recording or playback is performed to or from the disc-shaped recording medium. In recent years, various improvements associated with this structure have been proposed with the aims to achieve compactness, simplify components, and enhance workability.

For example, JP-A-2004-152388 discloses a disc apparatus which is so structured as to allow accurate positioning of a traverse unit and to be unlikely to be affected by external shock. Also the structure here is such that the traverse unit is stably held when it is in a retracted position. Specifically, at one end, the traverse unit is pivoted via cushioning members and, at the other end, it is fitted via cushioning members to a holder having a projection formed thereon. The projection of the holder is slidably fitted in a cam groove formed in a slider provided near the other end of the traverse unit. Thus, as the slider slides, the traverse unit swings in the up/down direction. Moreover, the holder has ribs formed on both side faces thereof, and the ribs engage with grooves formed in positioning members.

On the other hand, JP-A-2004-79024 discloses a supporting mechanism for a traverse mechanism which allows easy adjustment of the distance and parallelism between the traverse mechanism and the components arranged around it and which thus helps prevent defects in products attributable to uncertainties. Specifically, the traverse mechanism has vibration-damping members provided at least at three places thereon, and is floatingly supported on a base of a disc drive with the vibration-damping members held between a fitting member, having a screw part engaging with the base, and a stopper. Moreover, between the stopper and the base, a weighting member that resists the rotation of the fitting member is provided.

Disadvantageously, however, the structures disclosed in the patent publications mentioned above require extra space and extra work steps for fitting cushioning members or vibration-damping members. This makes it accordingly difficult to achieve compactness and enhance workability.

SUMMARY OF THE INVENTION

An object of the present invention is to provide a disc apparatus that can be built with a compact assembly structure of a traverse mechanism and gears, with simplified components, and with enhanced workability.

To achieve the above object, according to the present invention, a disc apparatus is provided with: a chassis that is fixed to an apparatus cabinet; a traverse mechanism that can, by being driven by a motor via a plurality of gears, ascend and descend in a predetermined direction relative to the chassis; and a pick-up unit that has an optical pick-up, that is provided in the traverse mechanism, and that can, by being driven by the motor, move in a direction substantially perpendicular to the direction in which the traverse mechanism ascends and descends. The disc apparatus is further provided with: a cam slider that is provided on the chassis so as to be able to move in a direction substantially perpendicular to both the direction in which the traverse mechanism ascends and descends and the direction in which the pick-up unit moves; and a shift lever that is provided in the traverse mechanism so as to make, by cam-engaging with the cam slider, the traverse mechanism ascend and descend. Here, a predetermined gear of the plurality of the gears is held between the traverse mechanism and the shift lever so as to be integral therewith.

The predetermined gear may be concentric with the screw with which the shift lever is fitted to the traverse mechanism. The predetermined gear may be supported by the plurality of gears other than the predetermined gear and by a rib provided on the shift lever.

According to the present invention, it is possible to realize a disc apparatus that can be built with a simple structure, achieving compactness, simplifying components, and enhancing workability, in particular in terms of the assembly structure of a traverse mechanism and gears.

Specifically, with a structure where a traverse mechanism has a gear and a shift lever fitted integrally therewith, it is possible to make components compact while preventing the gear from dropping off. Here, by making the gear concentric with the screw with which the shift lever is fitted, it is possible to achieve further compactness. Moreover, since the shift lever can be previously incorporated in the traverse mechanism, it is possible to enhance workability in the assembly line.

DETAILED DESCRIPTION OF PREFERRED EMBODIMENTS

Figure 1:
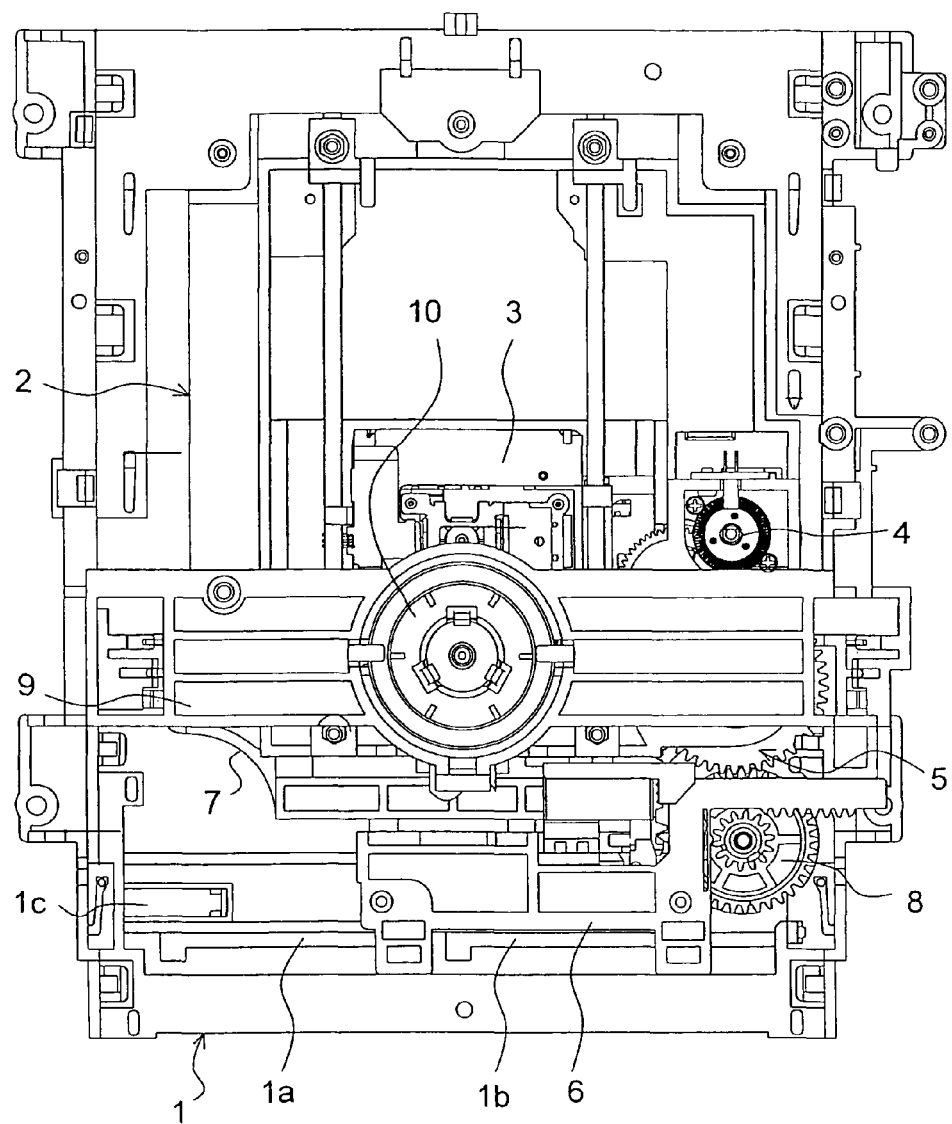
FIG. 1 is a diagram showing the disc loader of a disc apparatus embodying the present invention.
Figure 2:
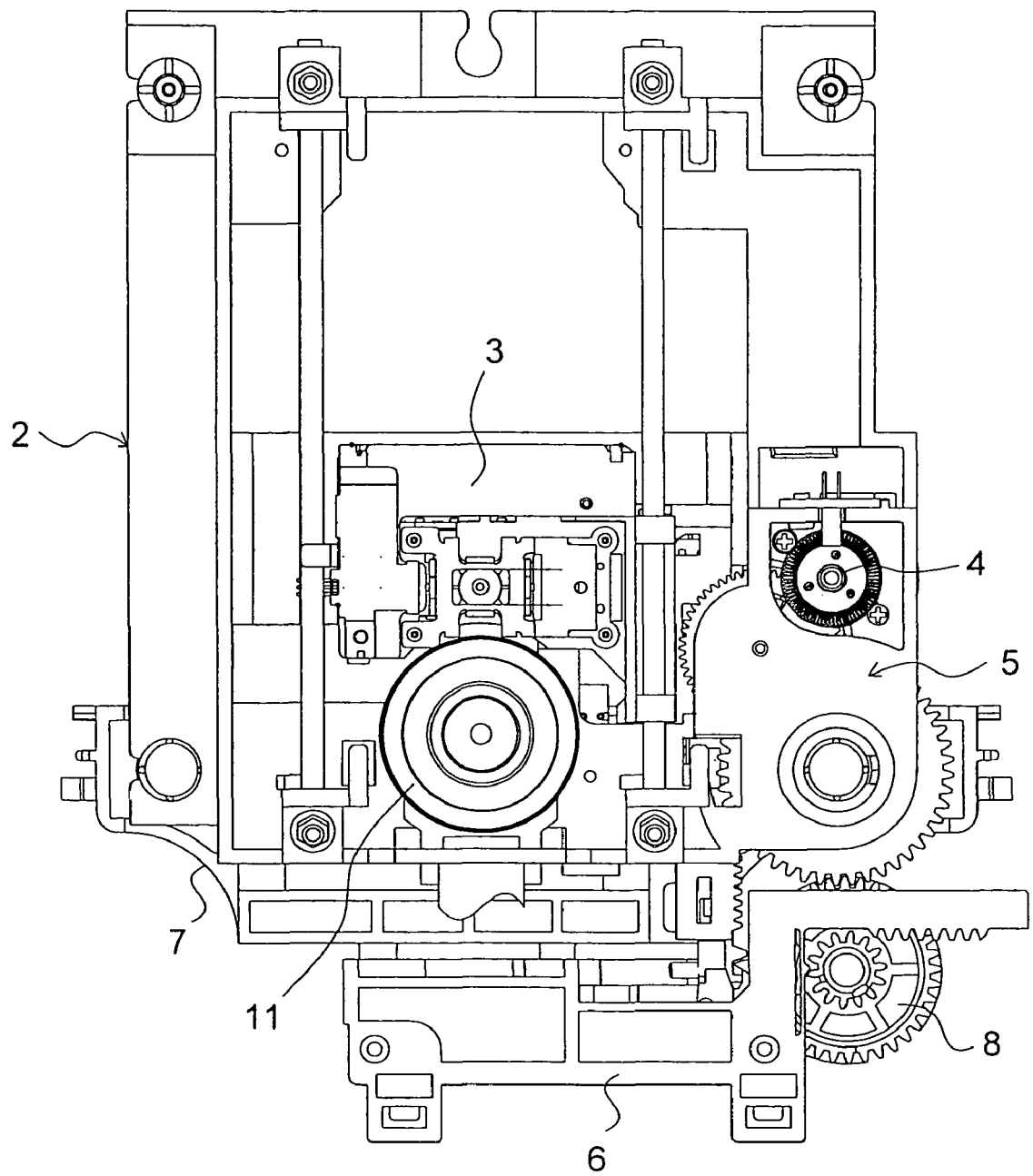
FIG. 2 is a diagram showing, mainly, the traverse mechanism of the disc apparatus.

Hereinafter, an embodiment of the present invention will be described with reference to the accompanying drawings. FIG. 1 is a plan view showing the disc loader of a disc apparatus embodying the present invention, and FIG. 2 is a plan view showing, mainly, the traverse mechanism of the disc apparatus. This disc apparatus has, provided on a loader chassis 1: a tray (unillustrated) that transports a disc-shaped recording medium; and a traverse mechanism 2 that can ascend and descend by pivoting in a direction substantially perpendicular to the transport direction (front/rear direction) of the tray. The loader chassis 1 is fixed to an apparatus cabinet (unillustrated).

The traverse mechanism 2 is provided with: a pick-up unit 3 having an optical pick-up that records to and plays back from the disk-shaped recording medium; and a motor 4 that moves the pick-up unit 3 in a direction radial to the disk-shaped recording medium. The motor 4 is provided with transmission means 5 composed of a plurality of flat gears, and the transmission means 5 transmits the driving force of the motor 4 while reducing the speed thereof. The transmission means 5 meshes with a rack (unillustrated) formed on the pick-up unit 3, and thereby allows the motor 4 to drive the pick-up unit 3 to move.

The transmission means 5 also meshes with a tray gear 8 provided in front, and the tray gear 8 can mesh with a cam slider 6 in front of the traverse mechanism 2, on the part of the loader chassis 1. The cam slider 6 engages with a shift lever 7 provided in front, and can move in a direction (left/right direction) substantially perpendicular to both the transport direction (front/rear direction) of the tray and the ascending/descending direction (left/right direction) of the traverse mechanism 2. The tray gear 8 can also mesh with a rack formed on the tray so that, with predetermined timing the tray gear 8 and the tray couple to each other to allow the driving force of the motor 4 to be transmitted to the tray.

In the disc apparatus structured as described above, when a disk-shaped recording medium is placed on the tray, the tray is transported into the disc loader by being driven by the motor 4. When the tray rests in a predetermined position, the tray and the tray gear 8 decouple from each other, and the cam slider 6 and the tray gear 8 couple to each other. The cam slider 6 moves in the direction (left/right direction) perpendicular to the transport direction of the tray, and thereby makes the traverse mechanism 2 ascend. Thus, the traverse mechanism 2 engages with the disk-shaped recording medium, and thereby clamps it.

The structure for clamping the disk-shaped recording medium is as follows. A substantially elongate-plate-shaped damper holder 9 is provided above the loader chassis 1 to extend from side to side. In the middle of the damper holder 9, a substantially disc-shaped damper 10 is rotatably provided. On the other hand, a turntable 11 that rotates by being driven by a spindle motor (unillustrated) is provided to protrude upward from the traverse mechanism 2. To achieve the above-mentioned clamping of the disk-shaped recording medium, the traverse mechanism 2 ascends so that the central hole of the disk-shaped recording medium fits on the turntable 11. Then the traverse mechanism 2 further ascends so that the disk-shaped recording medium is held between the turntable 11 and the damper 10.

When the disk-shaped recording medium is clamped, the tray gear 8 and the cam slider 6 decouple from each other, and the transmission means 5 and the pick-up unit 3 couple to each other. This allows the pick-up unit 3 to move in a direction radial to the disk-shaped recording medium, and thus makes it ready to record to or play back from a predetermined position on the disk-shaped recording medium. When the disk-shaped recording medium is taken out, the procedure described above is performed in the reverse order. Now, the assembly structure of the traverse mechanism in the disc apparatus according to the present invention will be described.

Figure 3:
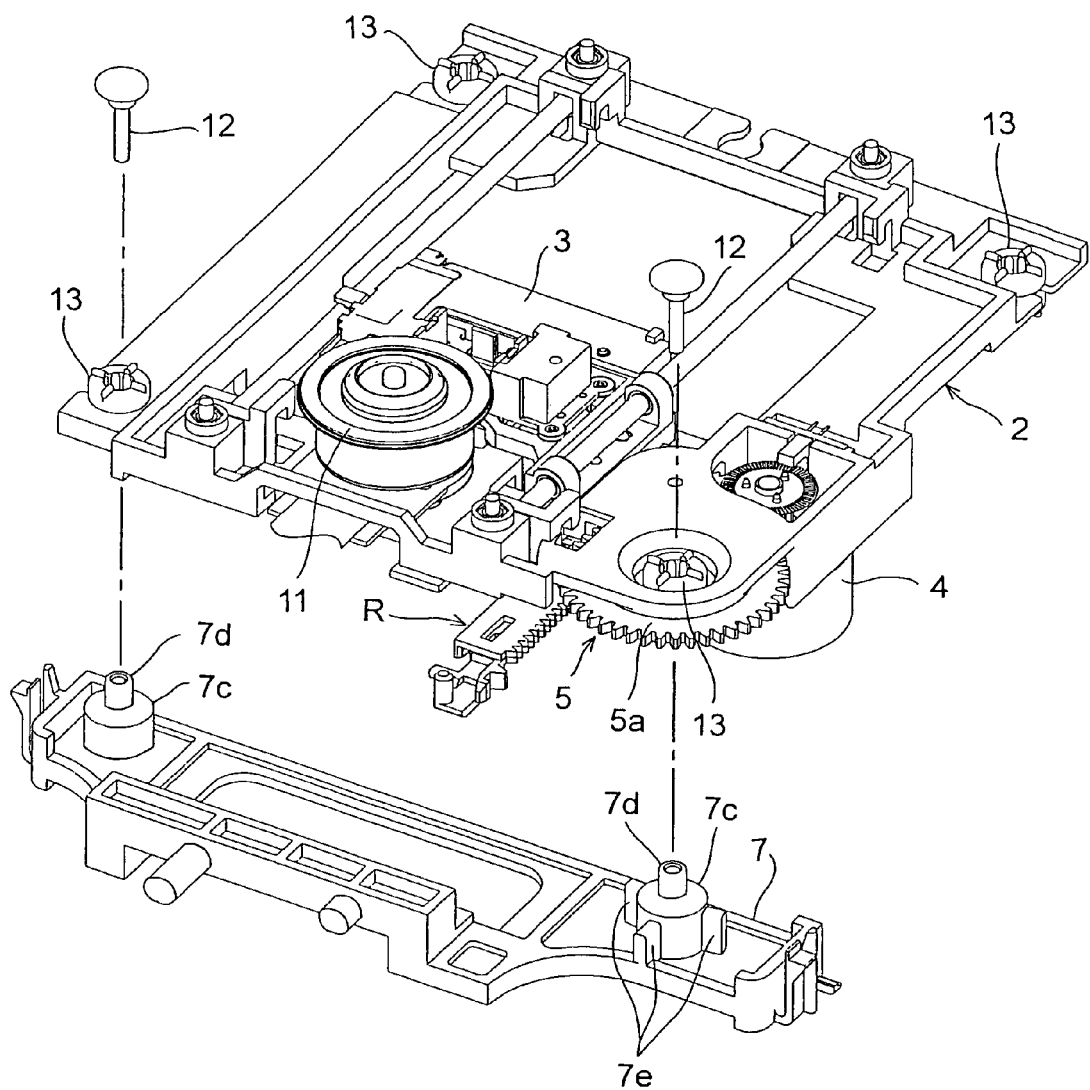
FIG. 3 is an upper perspective view showing the step of fitting a shift lever to the traverse mechanism.

FIG. 3 is an upper perspective view showing the step of fitting the shift lever to the traverse mechanism. As shown in FIG. 3, the shift lever 7 is fitted under a front part of the traverse mechanism 2. Specifically, through a total of two, front-left and front-right, parts, called mount parts, of the traverse mechanism 2, screws 12 are put from above, and are fixed via dampers 13 to the shift lever 7, placed below, by being screw-engaged therewith. Here, at the front-right mount part, a flat gear 5a located in a front part of the transmission means 5 is held between the traverse mechanism 2 and the shift lever 7. The flat gear 5a meshes with the tray gear 8 mentioned above.

Figure 4:
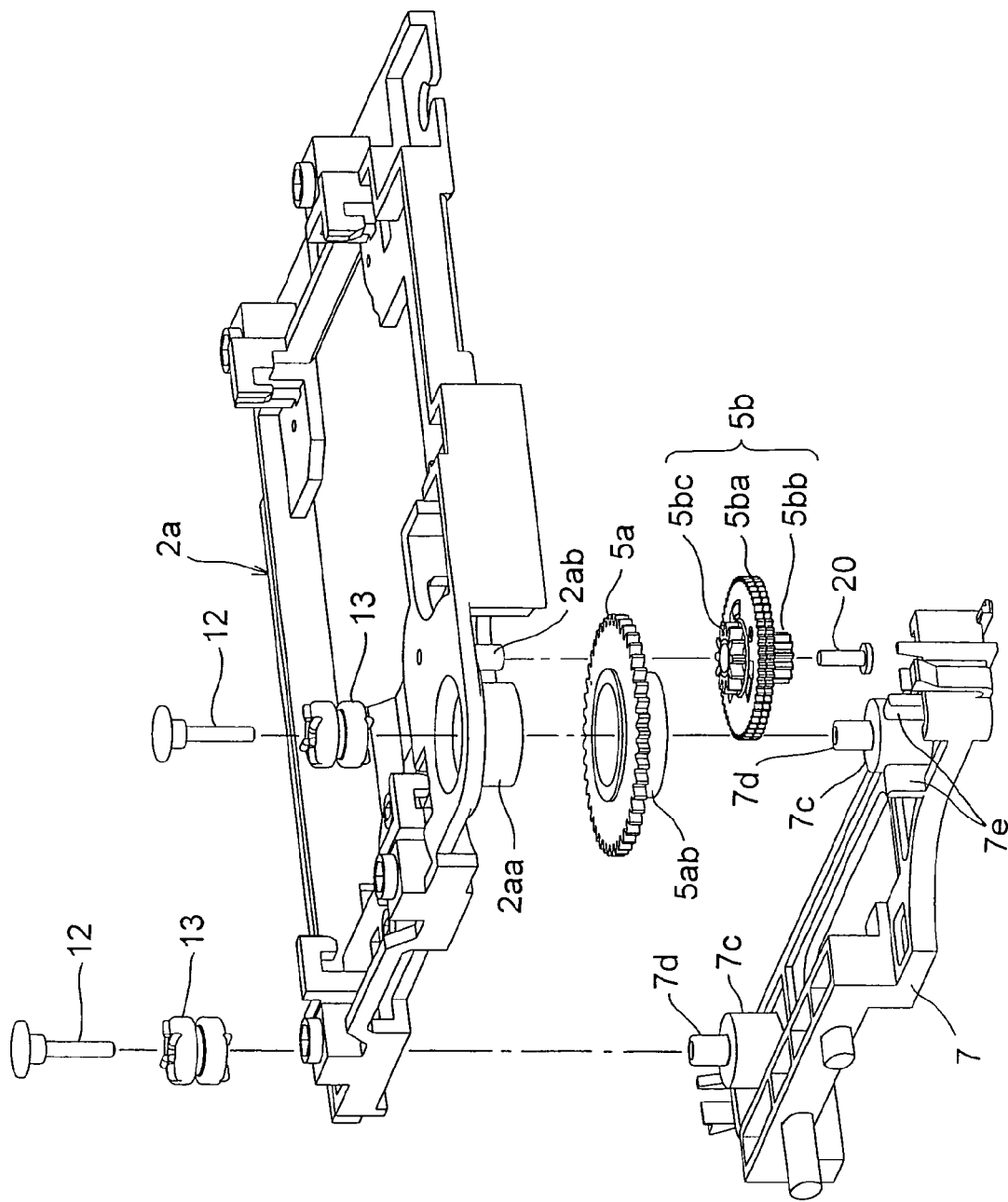
FIG. 4 is an exploded perspective view of a front part of the traverse mechanism.
Figure 5:
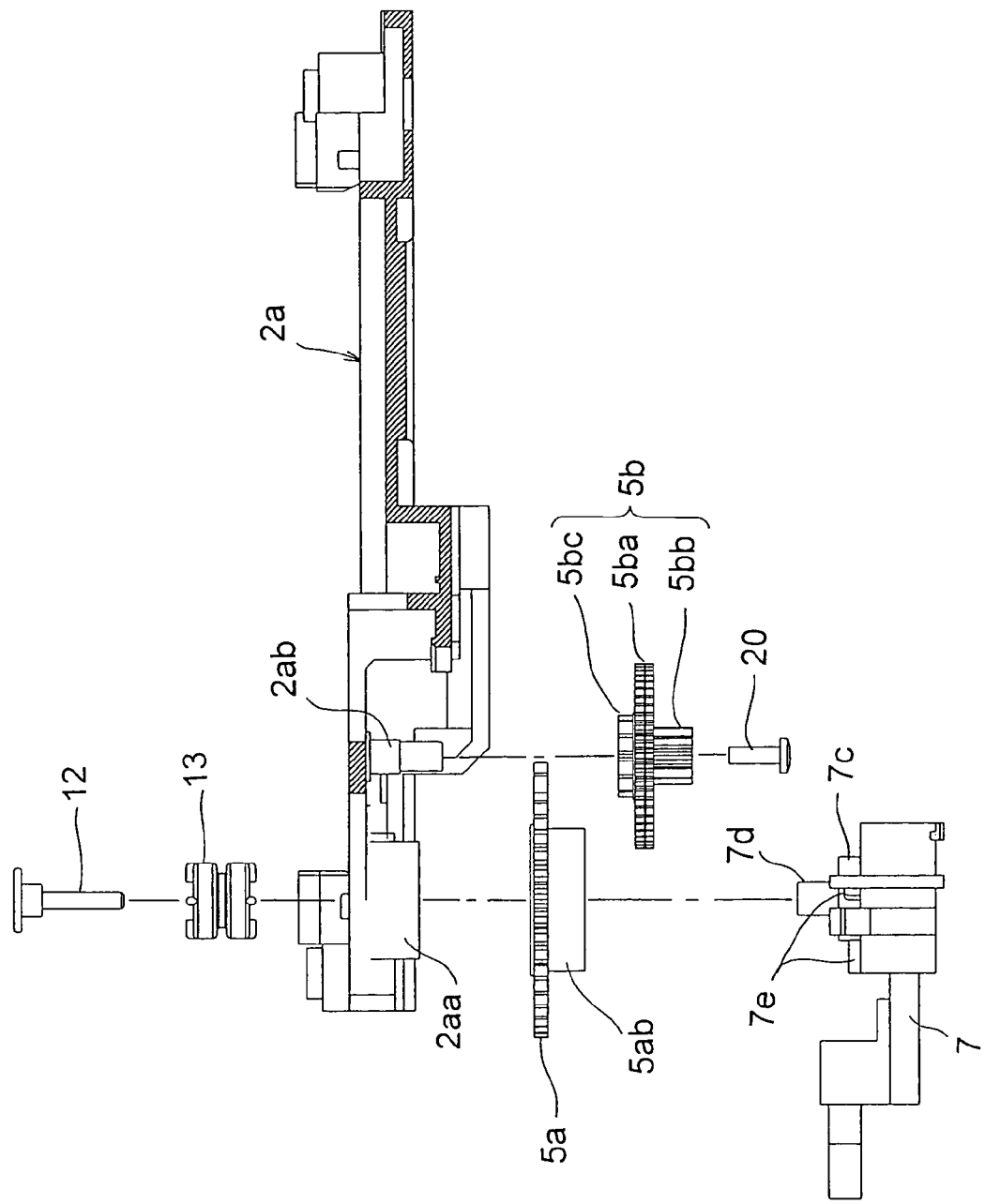
FIG. 5 is an exploded right side view of a front part of the traverse mechanism.

FIG. 4 is an exploded perspective view of a front part of the traverse mechanism, and FIG. 5 is an exploded right side view of a front part of the traverse mechanism. As shown in FIGS. 4 and 5, to achieve the fitting of the shift lever 7 under a front part of the traverse mechanism 2, first the dampers 13 are fitted at the two, front-left and front-right, mount parts of a mechanism chassis 2a. Then the flat gear 5a is rotatably fitted around a sleeve 2aa that is formed to protrude, in a cylindrical shape, downward from around the right-front mount part of the mechanism chassis 2a. Then a feed gear 5b located in a rear part of the transmission means 5 is rotatably fitted around a boss 2ab that is formed to protrude downward behind the sleeve 2aa, and is prevented from dropping off with a screw 20 that is screw-engaged from below.

In this state, a medium-diameter gear portion 5bc forming a top part of the feed gear 5b is meshed with the flat gear 5a; a large-diameter gear portion 5ba forming a middle part of the feed gear 5b is located under the flat gear 5a; a bottom part of the feed gear 5b is formed into a small-diameter gear portion 5bb. These gear portions are arranged concentrically, and are rotatable all together. In this state, the flat gear 5a has a rear part thereof supported by the feed gear 5b, and is thereby prevented from dropping off.

The large-diameter gear portion 5ba of the feed gear 5b meshes with a drive gear (unillustrated) fitted on the rotary spindle of the motor 4 so as to be driven to rotate. Rotating together therewith, the medium-diameter gear portion 5bc drives the flat gear 5a to rotate; likewise rotating together, the small-diameter gear portion 5bb meshes with and drives a rack assembly R (see FIG. 3) provided in the pick-up unit 3.

Near both, the left and right, ends of the shift lever 7, on a top face thereof, cylindrical base columns 7c are provided and, on the top ends thereof and concentrically therewith, bosses 7d are formed, respectively, to protrude upward. When the shift lever 7 is fitted, the dampers 13, which have previously been fitted at the mount parts of the mechanism chassis 2a, are fitted around the right and left bosses 7d, respectively. Here, the top ends of the base columns 7c serve as the surfaces on which the dampers rest. Then the screws 12 are put from above so that the dampers 13 are screw-fitted to the bosses 7d. Thus, the shift lever 7 is fitted via the dampers 13 to the mechanism chassis 2a.

Here, the bottom end of the sleeve 2aa, which appears below the bottom face of the flat gear 5a, touches the top ends of ribs 7e that are formed to protrude radially leftward, rightward, and frontward from the circumferential faces of the base columns 7c. Thus, the flat gear 5a has a left and a right part thereof supported by the ribs 7e, and has a rear part thereof supported by the feed gear 5b. This ensures stable rotation of the flat gear 5a. The ribs 7e may be formed in any shape other than specifically illustrated; for example, they may be ring-shaped to surround the base columns 7c.

As described above, according to the present invention, a traverse mechanism has a gear and a shift lever fitted integrally therewith, and this helps make components compact while preventing the gear from dropping off. Here, by making the gear concentric with the screw with which the shift lever is fitted, it is possible to achieve further compactness. Moreover, since the shift lever can be previously incorporated in the traverse mechanism, it is possible to achieve enhanced workability in the assembly line.

What is claimed is:

1. A disc apparatus including:
    a chassis that is fixed to an apparatus cabinet;

a traverse mechanism that can, by being driven by a motor via a plurality of gears, ascend and descend in a predetermined direction relative to the chassis;

a pick-up unit that has an optical pick-up, that is provided in the traverse mechanism, and that can, by being driven by the motor, move in a direction substantially perpendicular to the direction in which the traverse mechanism ascends and descends, and a tray that transports a disc in a front/rear direction, the disc apparatus comprising:

a cam slider that is provided in front of the traverse mechanism on the chassis so as to be able to move in a left/right direction substantially perpendicular to both the direction in which the traverse mechanism ascends and descends and the direction in which the tray transports the disc; and a shift lever that makes, by cam-engaging with the cam slider, the traverse mechanism ascend and descend, the shift lever being provided integrally with the traverse mechanism under a front part thereof such that a predetermined gear of the plurality of gears is held between the traverse mechanism and the shift lever, wherein the shift lever has, on top faces of left and right ends thereof, cylindrical base columns, the base column provided at the right end of the shift lever has ribs that protrude radially leftward, rightward, and frontward from a circumferential face of the base column, a screw with which the shift lever is fitted to the traverse mechanism, the predetermined gear, and the base column are concentric, and the predetermined gear is rotatably fitted around a cylindrical protrusion formed on a bottom of an outer edge part of the traverse mechanism in front thereof, a bottom end of a sleeve protruding from a bottom face of the predetermined gear makes contact with the ribs such that front-left and front-right parts of the predetermined gear are rotatably supported, and a rear part of the predetermined gear is rotatably supported by the gears other than the predetermined gear.

2. The disc apparatus of claim 1, wherein the shift lever is fitted to the traverse mechanism with the screw via a damper.

* * * * *